US010120346B2

(12) United States Patent
Matsue et al.

(10) Patent No.: US 10,120,346 B2
(45) Date of Patent: Nov. 6, 2018

(54) SATELLITE RADIO WAVE RECEIVING APPARATUS, RADIO CONTROLLED WATCH, CODE SIGNAL ACQUIRING METHOD, AND RECORDING MEDIUM

(71) Applicant: CASIO COMPUTER CO., LTD., Tokyo (JP)

(72) Inventors: Takeshi Matsue, Kokubunnji (JP); Hideo Abe, Tokorozawa (JP); Tatsuya Sekitsuka, Kunitachi (JP)

(73) Assignee: CASIO COMPUTERS CO., LTD., Tokyo (JP)

( * ) Notice: Subject to any disclaimer, the term of this patent is extended or adjusted under 35 U.S.C. 154(b) by 115 days.

(21) Appl. No.: 15/381,912

(22) Filed: Dec. 16, 2016

(65) Prior Publication Data

US 2017/0185049 A1 Jun. 29, 2017

(30) Foreign Application Priority Data

Dec. 24, 2015 (JP) ................................. 2015-251028

(51) Int. Cl.
| | |
|---|---|
| *H04B 1/00* | (2006.01) |
| *G04R 20/04* | (2013.01) |
| *H04B 1/7073* | (2011.01) |
| *H04B 7/185* | (2006.01) |
| *G01S 19/37* | (2010.01) |
| *H04B 1/7075* | (2011.01) |
| *G01S 19/30* | (2010.01) |

(52) U.S. Cl.
CPC .............. *G04R 20/04* (2013.01); *G01S 19/30* (2013.01); *G01S 19/37* (2013.01); *H04B 1/7075* (2013.01); *H04B 1/70735* (2013.01); *H04B 7/18517* (2013.01)

(58) Field of Classification Search
USPC .................................. 375/340, 149, 150, 147
See application file for complete search history.

(56) References Cited

U.S. PATENT DOCUMENTS

| | | | |
|---|---|---|---|
| 2001/0010505 A1* | 8/2001 | Naruse | G01S 19/34 342/357.65 |
| 2006/0093021 A1* | 5/2006 | Kang | H04B 1/70735 375/149 |
| 2010/0008192 A1* | 1/2010 | Abe | G04R 20/10 368/47 |

FOREIGN PATENT DOCUMENTS

JP 2007-187462 A 7/2007

* cited by examiner

*Primary Examiner* — Wednel Cadeau
(74) *Attorney, Agent, or Firm* — Scully, Scott, Murphy & Presser, P.C.

(57) ABSTRACT

A satellite radio wave receiving processing unit 60 includes a front end 60a which receives a radio wave including a code signal transmitted from a satellite, and a baseband unit 64 which acquires the code signal from the received radio wave, in which the baseband unit identifies a pseudo-random code sequence used for performing spread spectrum to the code signal and a phase of the pseudo-random code sequence in a transmission period, identifies a code type of the code signal every time according to the transmission period, identifies, by comparing an array of the identified code type with a plurality of comparison arrays expected to appear as the array of the code type, a head timing of each code in the code signal according to a comparison array in which a result of the comparison satisfies a predetermined condition, and identifies each code in synchronization with the identified head timing.

16 Claims, 8 Drawing Sheets

FIG. 5

| | | | | | | | | | | | | | | | | | | | | |
|---|---|---|---|---|---|---|---|---|---|---|---|---|---|---|---|---|---|---|---|---|
| r(0)  | 1 | 1 | 1 | 1 | 1 | 1 | 1 | 1 | 1 | 1 | 1 | 1 | 1 | 1 | 1 | 1 | 1 | 1 | 1 | 0 |
| r(1)  | 1 | 1 | 1 | 1 | 1 | 1 | 1 | 1 | 1 | 1 | 1 | 1 | 1 | 1 | 1 | 1 | 1 | 1 | 0 | 0 |
| r(2)  | 1 | 1 | 1 | 1 | 1 | 1 | 1 | 1 | 1 | 1 | 1 | 1 | 1 | 1 | 1 | 1 | 1 | 0 | 0 | 0 |
| r(3)  | 1 | 1 | 1 | 1 | 1 | 1 | 1 | 1 | 1 | 1 | 1 | 1 | 1 | 1 | 1 | 1 | 0 | 0 | 0 | 0 |
| r(4)  | 1 | 1 | 1 | 1 | 1 | 1 | 1 | 1 | 1 | 1 | 1 | 1 | 1 | 1 | 1 | 0 | 0 | 0 | 0 | 0 |
| r(5)  | 1 | 1 | 1 | 1 | 1 | 1 | 1 | 1 | 1 | 1 | 1 | 1 | 1 | 1 | 0 | 0 | 0 | 0 | 0 | 0 |
| r(6)  | 1 | 1 | 1 | 1 | 1 | 1 | 1 | 1 | 1 | 1 | 1 | 1 | 1 | 0 | 0 | 0 | 0 | 0 | 0 | 0 |
| r(7)  | 1 | 1 | 1 | 1 | 1 | 1 | 1 | 1 | 1 | 1 | 1 | 1 | 0 | 0 | 0 | 0 | 0 | 0 | 0 | 0 |
| r(8)  | 1 | 1 | 1 | 1 | 1 | 1 | 1 | 1 | 1 | 1 | 1 | 0 | 0 | 0 | 0 | 0 | 0 | 0 | 0 | 0 |
| r(9)  | 1 | 1 | 1 | 1 | 1 | 1 | 1 | 1 | 1 | 1 | 0 | 0 | 0 | 0 | 0 | 0 | 0 | 0 | 0 | 0 |
| r(10) | 1 | 1 | 1 | 1 | 1 | 1 | 1 | 1 | 1 | 0 | 0 | 0 | 0 | 0 | 0 | 0 | 0 | 0 | 0 | 0 |
| r(11) | 1 | 1 | 1 | 1 | 1 | 1 | 1 | 1 | 0 | 0 | 0 | 0 | 0 | 0 | 0 | 0 | 0 | 0 | 0 | 0 |
| r(12) | 1 | 1 | 1 | 1 | 1 | 1 | 1 | 0 | 0 | 0 | 0 | 0 | 0 | 0 | 0 | 0 | 0 | 0 | 0 | 0 |
| r(13) | 1 | 1 | 1 | 1 | 1 | 1 | 0 | 0 | 0 | 0 | 0 | 0 | 0 | 0 | 0 | 0 | 0 | 0 | 0 | 0 |
| r(14) | 1 | 1 | 1 | 1 | 1 | 0 | 0 | 0 | 0 | 0 | 0 | 0 | 0 | 0 | 0 | 0 | 0 | 0 | 0 | 0 |
| r(15) | 1 | 1 | 1 | 1 | 0 | 0 | 0 | 0 | 0 | 0 | 0 | 0 | 0 | 0 | 0 | 0 | 0 | 0 | 0 | 0 |
| r(16) | 1 | 1 | 1 | 0 | 0 | 0 | 0 | 0 | 0 | 0 | 0 | 0 | 0 | 0 | 0 | 0 | 0 | 0 | 0 | 0 |
| r(17) | 1 | 1 | 0 | 0 | 0 | 0 | 0 | 0 | 0 | 0 | 0 | 0 | 0 | 0 | 0 | 0 | 0 | 0 | 0 | 0 |
| r(18) | 1 | 0 | 0 | 0 | 0 | 0 | 0 | 0 | 0 | 0 | 0 | 0 | 0 | 0 | 0 | 0 | 0 | 0 | 0 | 0 |
| r(19) | 0 | 0 | 0 | 0 | 0 | 0 | 0 | 0 | 0 | 0 | 0 | 0 | 0 | 0 | 0 | 0 | 0 | 0 | 0 | 0 |

SATELLITE RADIO WAVE RECEIVING APPARATUS, RADIO CONTROLLED WATCH, CODE SIGNAL ACQUIRING METHOD, AND RECORDING MEDIUM

CROSS-REFERENCE TO RELATED APPLICATION

This application is based upon and claims the benefit of priority from the prior Japanese Patent Application No. 2015-251028, filed Dec. 24, 2015, the entire contents of which are incorporated herein by reference.

BACKGROUND OF THE INVENTION

The present invention relates to a satellite radio wave receiving apparatus, a radio controlled watch, a code signal acquiring method, and a recording medium.

Conventionally, there has been used an electronic watch (a radio controlled watch) having a function to acquire date and time information by receiving radio waves including the date and time information, and correct a date and time counted by the watch. The radio controlled watch can maintain substantially exactly counting and displaying a date and time without a user's correction operation by periodically and automatically performing such date and time correction.

The radio wave to be received by such a radio controlled watch includes radio waves transmitted from various positioning systems relating to a global navigation satellite system (GNSS), such as a positioning satellite in a global positioning system (GPS) of the United States. The radio wave from the positioning satellite is receivable in a wide area on the earth where the skies are visibly recognized, and is preferably used to adjust a date and time all over the world. In the radio wave transmitted from a positioning satellite, a signal coded in a predetermined format determined according to a positioning satellite (a code signal; a navigation message) is transmitted, and date and time information is acquired by decoding the code signal in accordance with the format.

By modulating a phase using an individual pseudo-random code for each positioning satellite, spread spectrum is performed to the code signal transmitted from the positioning satellite. In a positioning satellite in a GPS (referred to as a GPS satellite), by using a pseudo-random code sequence (a C/A code) having 1 msec period, phase modulation (spread spectrum) is performed to a code to be transmitted every 20 msecs (50 Hz) with 20 periods of C/A codes. After the C/A code and a phase of the C/A code in the received radio wave are identified, to decode the navigation message, it is required to identify a head position of each code (a code synchronization point), that is, to identify that the code is changed in synchronization with the C/A code in which period among the 20 periods.

In the radio controlled watch, the load of the processing to receive the radio wave is greatly larger than the processing to count and display the date and time. Especially, a portable electronic watch, such as a wristwatch which needs downsizing and lightning, has a problem that the weight limit of the mounted battery makes receiving processing for a long time and repetition of receiving processing in a short time difficult. On the other hand, the identification of the synchronization point sometimes fails when the receiving intensity is low, and has a problem that the processing cannot be terminated in a short time.

In contrast, for example, JP 2007-187462 A discloses a technique to complete identification of a synchronization point in a short time by performing in parallel the identification of the synchronization point of a C/A code used for performing phase modulation (spread spectrum) in a transmission radio wave in a L1 band of a GPS satellite and a P code used for performing spread spectrum in a transmission radio wave in a L2 band, and improving the synchronization accuracy.

However, with a conventional technique, performing multiple identifying processing in parallel increases the processing load. In other words, when a satellite radio wave is received, there is a problem that a code signal cannot quickly certainly be acquired from the received satellite radio wave while suppressing a load caused by identifying a synchronization point.

SUMMARY OF THE INVENTION

A purpose of the invention is to provide a satellite radio wave receiving apparatus, a radio controlled watch, a code signal acquiring method, and a recording medium which can easily and quickly acquire a code signal form a received satellite radio wave while suppressing a load from increasing.

To attain the purpose, an embodiment of the present invention provides a satellite radio wave receiving apparatus including a receiver configured to receive a radio wave including a code signal transmitted from a satellite, and a demodulator configured to acquire the code signal from the received radio wave, in which the demodulator identifies a pseudo-random code sequence used for performing spread spectrum to the code signal and a phase of the pseudo-random code sequence in a transmission period, identifies a code type of the code signal every time according to the transmission period, identifies, by comparing an array of the identified code type with a plurality of comparison arrays expected to appear as the array of the code type, a head timing of each code in the code signal according to the comparison array in which a result of the comparison satisfies a predetermined condition, and identifies each code in synchronization with the identified head timing.

BRIEF DESCRIPTION OF THE DRAWINGS

FIG. 5 is a table showing 20 patterns of code sequences output from a replica code generating unit;

DETAILED DESCRIPTION

Embodiments of the present invention are described with reference to the drawings below.

Figure 1:
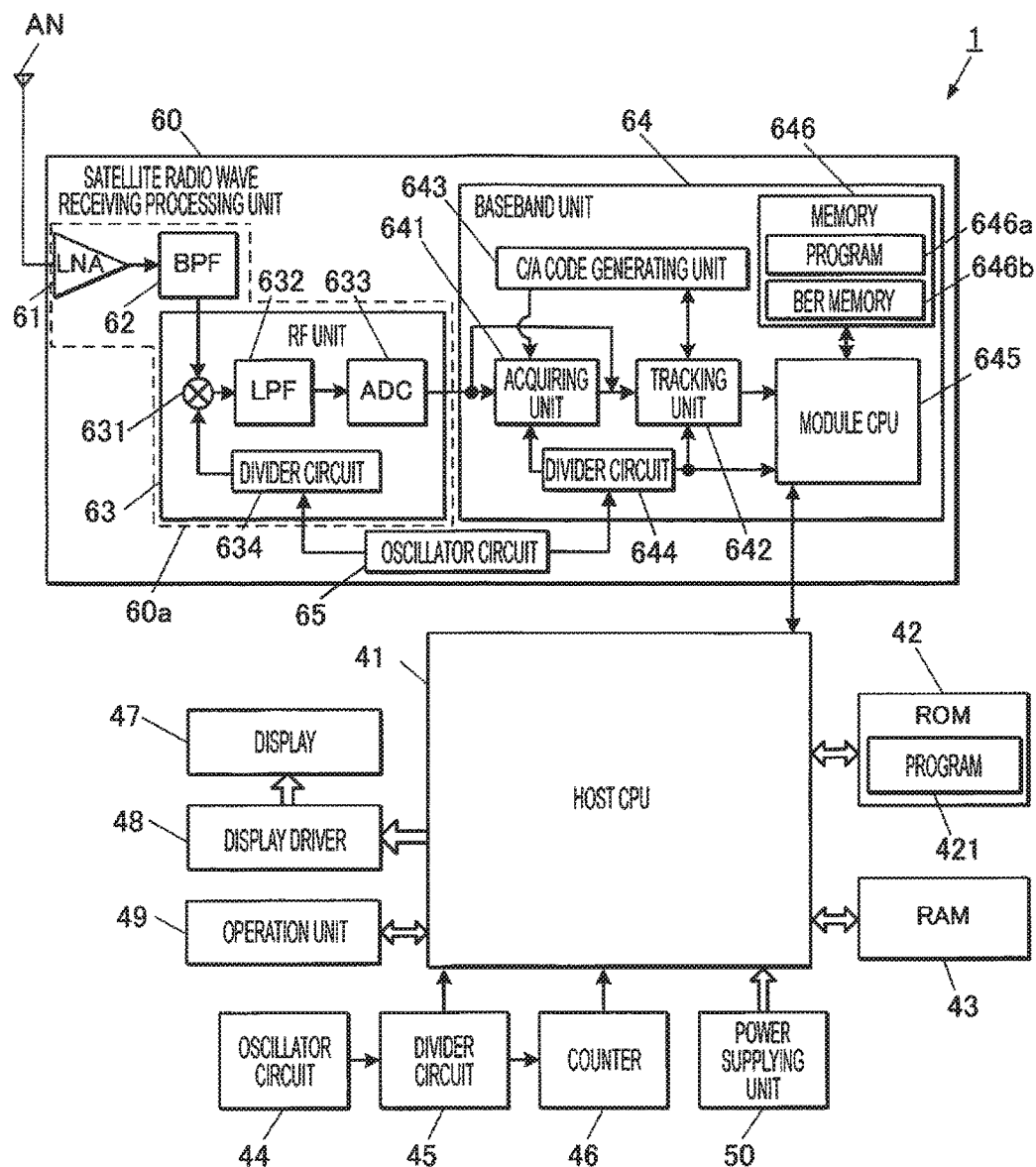
FIG. 1 is a block diagram illustrating a functional configuration of an electronic watch in an embodiment of the present invention.

FIG. 1 is a block diagram illustrating a functional configuration of an electronic watch 1 which is a radio controlled watch in an embodiment of the present invention.

The electronic watch 1 is a radio controlled watch capable of receiving a radio wave from a positioning satellite (a satellite) relating to, at least, a global positioning system (GPS) of the United States (hereinafter, referred to as a GPS satellite), demodulating a signal (a code signal), and acquiring date and time information.

The electronic watch 1 includes a host central processing unit (CPU) 41, a read only memory (ROM) 42, a random access memory (RAM) 43, an oscillator circuit 44, a divider circuit 45, a counter 46, a display 47, a display driver 48, an operation unit 49, a power supplying unit 50, a satellite radio wave receiving processing unit 60 as a satellite radio wave receiving apparatus, and an antenna AN.

The host CPU 41 performs various types of arithmetic processing, and collectively controls the entire operation of the electronic watch 1. The host CPU 41 reads a control program from the ROM 42, and loads the program in the RAM 43, and thereby performs display of a date and time, arithmetic control relating to various functions, and various types of operation processing, such as display. Furthermore, the host CPU 41 causes the satellite radio wave receiving processing unit 60 to operate and to receive a radio wave from a positioning satellite, and acquires date and time information or position information calculated by the satellite radio wave receiving processing unit 60 based on the received contents.

The ROM 42 is a mask ROM, a rewritable nonvolatile memory, or the like, and stores control programs and initial setting data. The control program includes a program 421 to control various types of processing to acquire various types information from the positioning satellite.

The RAM 43 is a volatile memory, such as an SRAM or a DRAM, provides the host CPU 41 with a memory space for working, and stores temporary data and various types of setting data. The various types of setting data include a date and time count in the electronic watch 1, and local time setting relating to display, that is, home city setting relating to a time zone, and setting relating to presence or absence of summer time. A part of or all of the various types of setting data to be stored in the RAM 43 may be stored in a nonvolatile memory.

The oscillator circuit 44 generates and outputs a predetermined frequency signal. As the oscillator circuit 44, a crystal oscillator is used, for example.

The divider circuit 45 divides a frequency signal input from the oscillator circuit 44 into signals having a frequency of a clock signal used by the counter 46 or the host CPU 41, and outputs the signals. The frequency of the output signal may be changeable based on setting of the host CPU 41.

The counter 46 counts the current date and time by counting the number of input times of a predetermined frequency signal (a clock signal) input from the divider circuit 45 and adding the number to an initial value. The counter 46 may vary a value to be stored in a RAM by software, or includes a dedicated counter circuit. The date and time counted by the counter 46 is not especially limited, and is any one of an accumulated time from a predetermined timing, the universal time coordinated (UTC) date and time, or a date and time in a home city (a local time) set in advance. Note that, the date and time itself counted by the counter 46 is not necessarily held in a format of year-month-day and hour-minute-second. The clock signal input from the divider circuit 45 to the counter 46 can include a slight shift from the exact time-lapse. The amount of the shift (rate) of the date and time counted by the counter 46 per day varies according to an operation environment, such as temperature, but is normally within ±0.5 seconds.

The display 47 includes, for example, a display screen, such as a liquid crystal display (LCD) or an organic electroluminescent (EL) display, and performs a digital display operation relating to the date and time and various functions based on either or a combination of a dot matrix system or/and a segment system.

The display driver 48 outputs a drive signal according to the type of the display screen to the display 47 based on a control signal from the host CPU 41, and displays the signal on the display screen.

The operation unit 49 accepts an input operation from a user, and outputs an electrical signal according to the input operation to the host CPU 41 as an input signal. The operation unit 49 includes, for example, a push button switch and a winding crown switch.

Alternatively, with a touch sensor provided on the display screen of the display 47, the display screen functions as a touch panel which outputs an operation signal according to detection of a touching position or a touching behavior of a user's touching operation to the touch sensor, and thereby the display 47 and the operation unit 49 may be integrally provided.

The power supplying unit 50 includes a battery, and supplies the units with power relating to the operations of the electronic watch 1 at a predetermined voltage. As the battery of the power supplying unit 50, a solar panel and a secondary cell are used here. The solar panel generates electromotive force with incident light, supplies power with the units, such as the host CPU 41, and accumulates the power in the secondary cell if surplus power is generated. On the other hand, if the power which can be generated is insufficient for consumption power due to the amount of incident light from outside to the solar panel, the secondary cell supplies the units with power. Alternatively, as the battery, a primary cell, such as a button type dry cell, may be used.

The satellite radio wave receiving processing unit 60 tunes in a radio wave including a coded signal (a code signal) transmitted from the positioning satellite through the antenna AN, identifies a C/A code (a pseudo-random code sequence) and a phase of the C/A code used for performing spread spectrum to the code signal, and acquires the signal. The satellite radio wave receiving processing unit 60 demodulates the acquired code signal, identifies the code sequence to perform necessary processing, and acquires desired information. The satellite radio wave receiving processing unit 60 includes an LNA 61 (a low noise amplifier), a BPF 62 (a narrow band filter), an RF unit 63, a baseband unit 64 (demodulator), and an oscillator circuit 65.

The RF unit 63 converts the received radio wave signal (an RF signal) into a signal in an intermediate frequency band (an IF signal), and digitally converts the signal at a predetermined sampling frequency. The RF signal in the predetermined frequency band received by the antenna AN, for example, in an L1 band (1.57542 GHz) from a GPS satellite is amplified by the high-gain LNA 61, and a receiving target frequency width alone is selectively passed through the BPF 62, such as a surface acoustic wave (SAW) filter, and input to the RF unit 63. The LNA 61, the BPF 62, and the RF unit 63 are front ends 60a (a receiver) of the satellite radio wave receiving processing unit 60.

The RF unit 63 includes a mixer 631, an LPF 632 (a low pass filter), an ADC 633 (an analog-digital converter), and a divider circuit 634.

The divider circuit 634 operates as a local oscillator, divides the clock signal having a predetermined frequency input from the oscillator circuit 65 into a signal having an appropriate frequency, and inputs the signal to the mixer 631.

The mixer 631 mixes the RF signal input from the BPF 62 and the divided clock signal input from the divider circuit 634 to convert to the RF signal into the IF signal.

The LPF 632 selectively allows a signal in a range corresponding to the frequency signal to be received among IF signals to pass. The received frequency of the radio wave from the positioning satellite is shifted by the Doppler effect according to the relative velocity between the positioning satellite and the receiving position, and the received frequency is changeable within a range of a shift amount expected based on the transmission frequency (L1 band).

The ADC 633 converts the signal having passed through the LPF 632 into a digital discrete value at a predetermined sampling frequency. Here, the ADC 633 acquires the signal as the digital discrete value at a sampling frequency higher than a frequency according to the frequency of the IF signal (that is, a transmission frequency (1023 kHz) of each code (chip) of the C/A code), and outputs the value to an acquiring unit 641 or a tracking unit 642 of the baseband unit 64.

The baseband unit 64 processes the IF signal data converted into the digital discrete value, and acquires and calculates desired information.

The baseband unit 64 includes an acquiring unit 641 (an acquiring unit), a tracking unit 642 (a code type determining unit, a code synchronization detecting unit, and a code identifying unit), a C/A code generating unit 643, a divider circuit 644, a module CPU 645, and a memory 646 (a memory).

The module CPU 645 controls the operations of the satellite radio wave receiving processing unit 60 according to a control signal from the host CPU 41 or an input of setting data. The module CPU 645 reads a necessary program or setting data from the memory 646, operates the units of the RF unit 63 and the baseband unit 64, demodulates the received radio wave from each positioning satellite (inverse spread spectrum and identification of each code), and acquires date and time information or position information.

The module CPU 645 decodes the demodulated code signal, and acquires desired information, or can also identify, without decoding, the received contents and its timing by comparing the demodulated code sequence with a code sequence for comparison set in advance according to the format of the navigation message, and detecting matching.

The memory 646 includes various nonvolatile memories, such as a flash memory or an electrically erasable and programmable read only memory (EEPROM), and a RAM. The nonvolatile memory of the memory 646 stores various programs 646a to measure a position and acquire date and time information, setting data, and histories of the measurement of the position and the acquisition of the date and time information. The data to be stored in the nonvolatile memory includes precise orbit information on each positioning satellite (Ephemeris), prediction orbit information (Almanac), a previous measured date and time and position, and a BER memory 646b (a bit error rate; a code error rate; a misidentification incidence rate) used to verify the identification of the code. Here, the BER memory 646b stores data of the code error rates associated with a plurality of stages of satellite radio wave receiving intensities (a correspondence relation between the receiving intensities and the code error rates). Furthermore, the RAM provides the module CPU 645 of the satellite radio wave receiving processing unit 60 with a memory space for working, and stores various types of temporary data.

The acquiring unit 641 identifies a type of the received positioning satellite, that is, the C/A code and a phase of the C/A code by calculating a correlation value between the digital discrete value of the IF signal input from the RF unit 63 and the C/A code in the phase of each positioning satellite, and detecting the peak. For the acquiring operation, for example, a matched filter is used, the correlation values of the C/A codes of a plurality of positioning satellites are calculated simultaneously in parallel.

The tracking unit 642 maintains the identified C/A code and the phase of the C/A code of the identified positioning satellites, and continuously acquires the code signal relating to the navigation message from the positioning satellite. The tracking unit 642 acquires and feeds back difference information between the phase of the C/A code in the received signal and the phase of the C/A code input from the C/A code generating unit 643, performs inverse spread spectrum and demodulation of the radio wave to the received radio wave, and identifies each code (message code) while finely adjusting the phase shift. A plurality of configurations of the tracking unit 642 are provided in parallel according to the number of positioning satellites which are processable in parallel. The configuration of the tracking unit 642 is detailedly described later.

The C/A code generating unit 643 holds in advance chip array information and the C/A codes of positioning satellites which can be received, sequentially generates the C/A codes of the positioning satellite to be reception candidates, or the identified positioning satellites, and selectively outputs the code to either the acquiring unit 641 or the tracking unit 642 at an appropriate speed. The C/A code generating unit 643 can simultaneously generate the C/A codes relating to a plurality of positioning satellites and output the codes to the acquiring unit 641 and the tracking unit 642 in parallel. Furthermore, the phase of the C/A code to be output to the tracking unit 642 can be changed according to a control signal from the tracking unit 642 as described later.

The divider circuit 644 supplies the units of the baseband unit 64 with a predetermined clock signal. The clock signal generated by the divider circuit 644 is used to, for example, generate an I-phase signal (In-phase) and a Q-phase signal (Quadrature-phase) which are the IQ-separated IF signal input to the tracking unit 642.

The units of the baseband unit 64, especially, the acquiring unit 641 and the tracking unit 642 have dedicated hardware configurations (processors) and efficiently perform processing, but a CPU as a processor may perform a part or all of the functional operations of the units under the software control.

The satellite radio wave receiving processing unit 60 is supplied with power directly from the power supplying unit 50, and its ON/OFF is switched by a control signal from the host CPU 41. In other words, the power supply to the satellite radio wave receiving processing unit 60 is disconnected separately from the host CPU 41 or the like which constantly operates while the radio wave reception from the positioning satellite, the date and time acquisition, and a calculation operation relating to measurement of the position are not performed.

Next, the format of the navigation message transmitted from the GPS satellite is described.

In the GNSS, by dispersedly arranging a plurality of positioning satellites on a plurality of orbits, radio waves transmitted from the different positioning satellites are receivable from an observation point simultaneously. Thus, information on the current positions of the positioning satellites and date and time information transmitted from the receivable positioning satellites are acquired from four or more positioning satellites (three positioning satellites on the assumption of being on the ground surface), and the position coordinates and the date and time in a three-dimensional space can be determined by using the shift between the acquired data and the acquired timing, that is, the difference between the propagation times (distances) from the positioning satellites. Furthermore, if the date and time information is acquired from one positioning satellite alone, the current date and time can be acquired within an error range (about less than 100 msecs) of the propagation time from the positioning satellite.

The positioning satellite generates a binary code array (navigation message) indicating information on the date and time, information on the position of the satellite, and status information on the satellite's condition, and performs spread spectrum by modulating the phase (BPSK) with the unique C/A code (pseudo-random noise) for each positioning satellite, and transmits the navigation message. The format of the code signal (the format of the navigation message) is determined for each positioning system.

Figure 2:
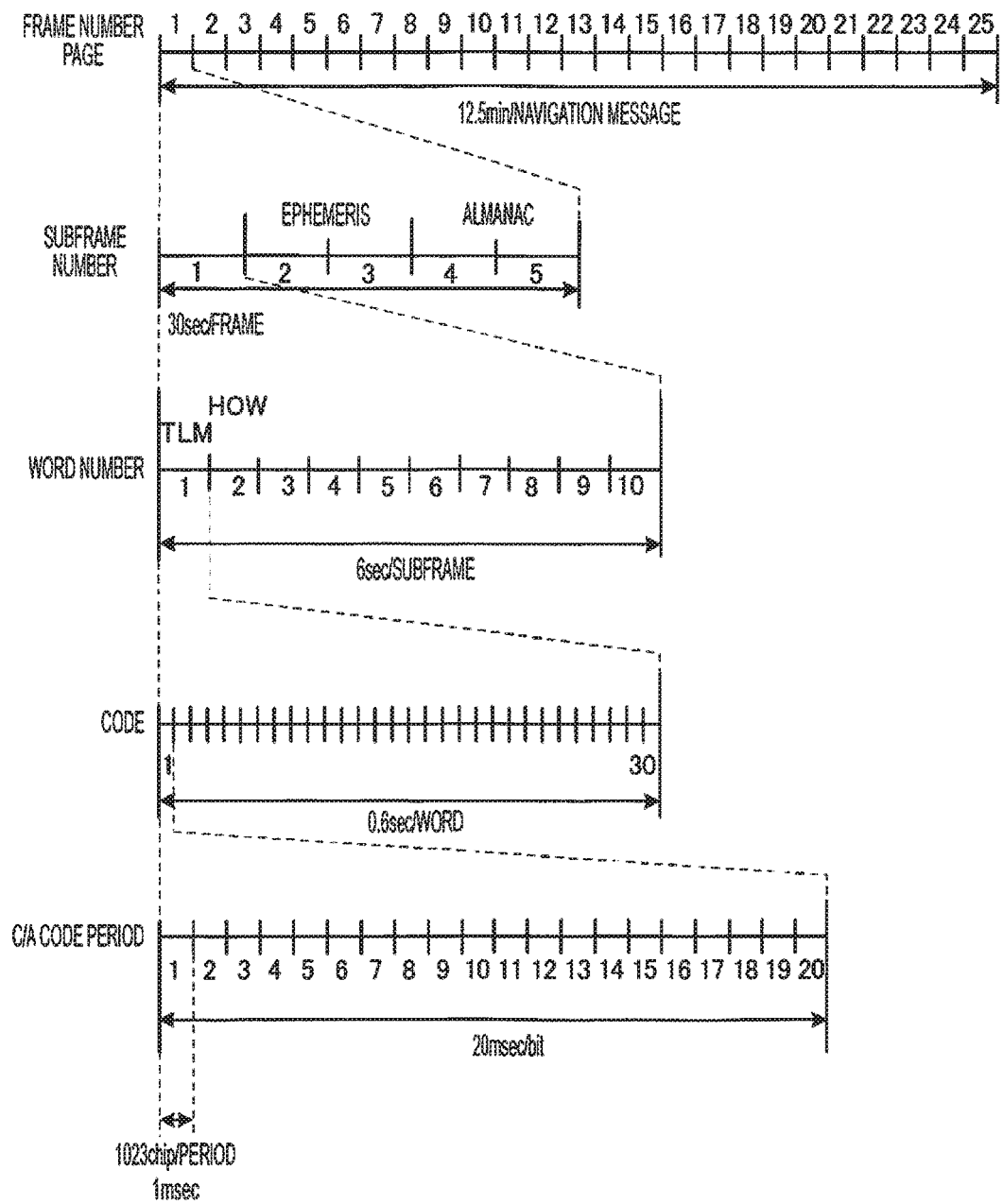
FIG. 2 is a diagram explaining a navigation message transmitted from a GPS satellite.

FIG. 2 is a diagram explaining the navigation message transmitted from the GPS satellite.

In the GPS, each GPS satellite transmits 25 pages in total of frame data in 30-second units, and outputs all data in a 12.5-minute period. The unique C/A code is used for each GPS satellite in the GPS, and 1023 codes (chips) are arranged at 1.023 MHz and are repeated in a 1-msec period (transmission period) in the C/A code. The transmission time of each code (message code) of the code sequence which is the navigation message, is 20 msecs, that is, the length of 20 periods of the C/A codes, and a head timing of the message code is synchronized with a head timing of the transmission period of the C/A code.

By arranging the 30 message codes, a word of 0.6 seconds is constituted, and 10 words constitute a 6-second period subframe. Then, data of five subframes is to be data of one frame. The head of each subframe, that is, the head of the first word includes a telemetry word (TLM) including a preamble which is a fixed code sequence, and can be used to synchronize the code sequence. Furthermore, the second word includes a hand over word (HOW) including date and time information, and is used to acquire the date and time information. The second and following subframes include orbit information on the positioning satellite, and the information is used when the current position is specified (measured).

Next, the configuration to acquire the navigation message from the satellite radio wave received by the electronic watch 1 of the present embodiment is described.

Figure 3:
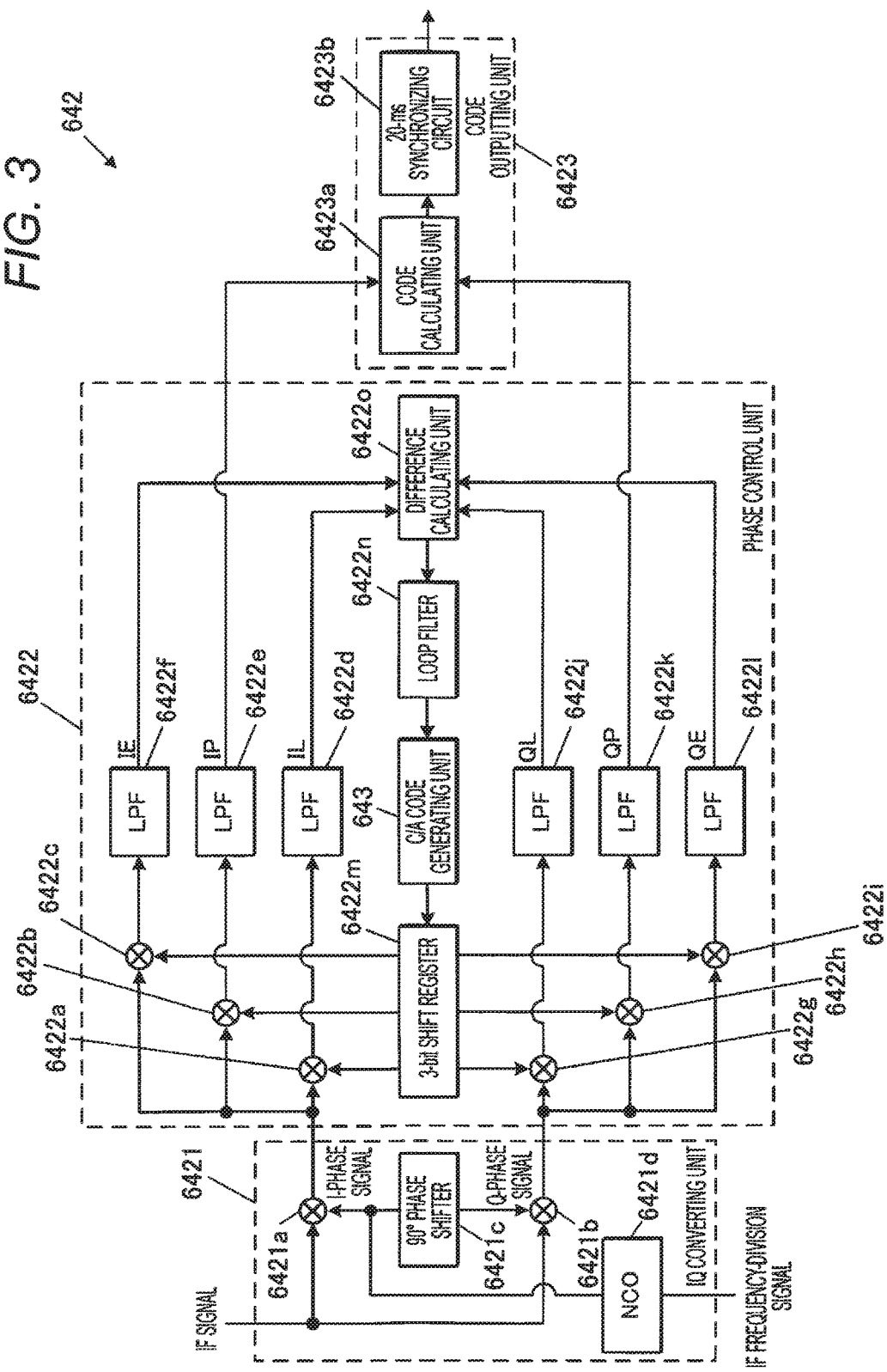
FIG. 3 is a block diagram illustrating a configuration of a tracking unit.

FIG. 3 is a block diagram illustrating a configuration of the tracking unit 642.

The tracking unit 642 includes an IQ converting unit 6421, a phase control unit 6422, and a code outputting unit 6423.

The IQ converting unit 6421 divides the IF signal into the I-phase signal and the Q-phase signal, and outputs the signals. The IQ converting unit 6421 includes two mixers 6421a and 6421b, a 90° phase shifter 6421c, and an NCO 6421d (a numeric value control oscillator). The mixer 6421a mixes the input IF signal acquired at the sampling frequency of the ADC 633 with a sinusoidal signal output from the NCO 6421d according to the clock signal having the IF frequency input from the divider circuit 644, and generates and outputs the I-phase signal. Furthermore, in the IQ converting unit 6421, the 90° phase shifter 6421c performs phase shift to the sinusoidal signal output from the NCO 6421d to make a cosine signal, and the mixer 6421b mixes the cosine signal with the IF signal, and thereby the Q-phase signal is generated and output.

The phase control unit 6422 detects and feeds back phase shift of the input I-phase signal and Q-phase signal by calculating, using the C/A code (chip) having the identified phase and chips having phases shifted forward and backward from the identified phase by a predetermined interval (for example, ±0.5 chip), a correlation value between the C/A code having the three phases, the I-phase signal, and the Q-phase signal.

The phase control unit 6422 includes three mixers 6422a to 6422c for the I-phase signal, LPFs 6422d to 6422f corresponding to the mixers 6422a to 6422c respectively, three mixers 6422g to 6422i for the Q-signal, LPFs 6422j to 6422l corresponding to the mixers 6422g to 6422i, a 3-bit shift register 6422m, a loop filter 6422n, and a difference calculating unit 6422o.

The C/A code of the acquired positioning satellite is generated by the C/A code generating unit 643, and sequentially input to the 3-bit shift register 6422m bit by bit at a timing to be the phase of the above predetermined interval earlier than the identified phase. The input code data is moved to the second bit position at the predetermined interval, and further moved to the third bit position. In other words, the 3-bit codes to be stored to the 3-bit shift register 6422m are three of the code at the predetermined interval (early phase) earlier than the identified phase, the code at the identified phase (punctual phase), and the code at the predetermined interval later than the identified phase (late phase).

The three codes are respectively mixed by the mixers 6422a to 6422c with the I-phase signal, and mixed by the mixers 6422g to 6422i with the Q-phase signal. The output signals of the mixers 6422a to 6422c are respectively input to the LPFs 6422d to 6422f, and converted into a mean value of about 1 ms corresponding to a period of the C/A code (a code mean value). Furthermore, the output signals of the mixers 6422g to 6422i are respectively input to the LPF 6422j to 6422l, and converted into a mean value of about 1 ms similarly. Note that, instead of a mean value, an additional value may be calculated.

Signals IE and QE which are the code length mean values of the output signals of the mixers 6422a and 6422g to be mixed with the IF signal of the advanced phase of the three chips (early phase), and signals IL and QL which are the code length mean values of the output signals of the mixers 6422c and 6422i to be mixed with the IF signal of the delayed phase (late phase) are input to the difference calculating unit 6422o. The autocorrelation of the C/A code becomes maximum (correlation coefficient=1) when the phases are equal, and the correlation coefficient approaches "0" when the phases are shifted and the correlation coefficient suddenly drops. The propagation time of the radio wave from the positioning satellite varies according to the relative distance between the positioning satellite and the receiving position, and which causes a phase shift. By calculating the difference between a value indicating a correlation value relating to the signal of the advanced phase (IE2+QE2) and a value indicating a correlation value relating to the signal of the delayed phase (IL2+QL2), the phase control unit 6422 detects a slight phase shift and its direction of the actual IF signal with respect to the phases of the compared three chips.

The calculation result of the difference calculating unit 6422o is fed back to the C/A code generating unit 643 through the loop filter 6422n, and the output timing of each code data from the C/A code generating unit 643 to the 3-bit shift register 6422m is finely adjusted.

A signal IP which is a time mean value of the output signal of the mixer 6422b to be mixed with the I-phase signal of the intermediated phase (punctual phase) of the three codes output from the 3-bit shift register 6422m and a signal QP which is a time mean value of the output signal of the mixer 6422h to be mixed with the Q-phase signal are output to the code outputting unit 6423.

The code outputting unit 6423 includes a code calculating unit 6423a, and a 20-ms synchronizing circuit 6423b.

The code calculating unit 6423a calculates the code type of the original navigation message obtained by performing inverse spread spectrum using the input signal IP and signal QP every msec (every time according to the transmission period of the C/A code). The calculated reception code is output to the 20-ms synchronizing circuit 6423b and further output to the module CPU 645. Furthermore, the 20-ms synchronizing circuit 6423b detects, based on the array of the code type, the synchronization point of 20 msecs which is the length of the message code (that is, the head timing of each code). The head timing in 1-msec units (a chip synchronization point) is determined in synchronization with the timing when the code of the replica code sequence is output from the C/A code generating unit 643 to the 3-bit shift register 6422m.

Figure 4:
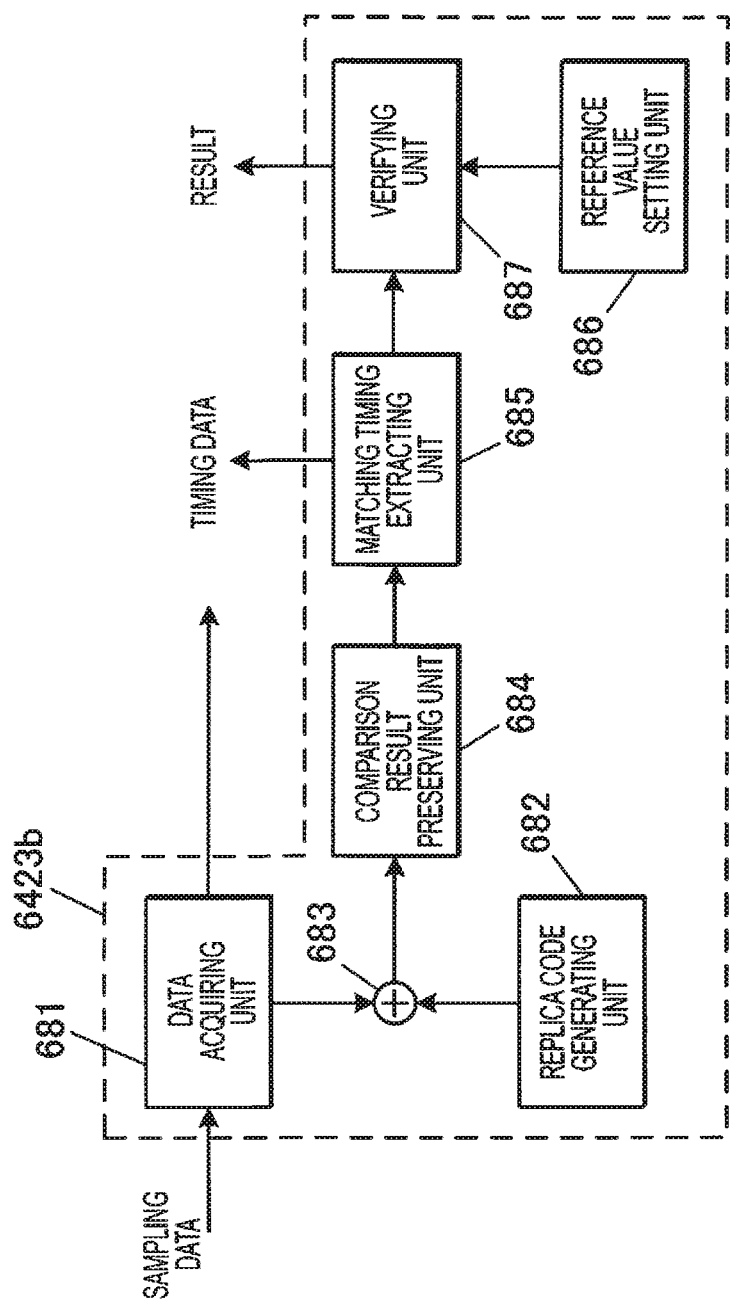
FIG. 4 is a block diagram illustrating a configuration of a 20-ms synchronizing circuit.

FIG. 4 is a block diagram illustrating the configuration of the 20-ms synchronizing circuit 6423b.

The 20-ms synchronizing circuit 6423b includes a data acquiring unit 681, a replica code generating unit 682, an exclusive OR calculating unit 683, the result of the comparison result preserving unit 684, a matching timing extracting unit 685, a reference value setting unit 686, and a verifying unit 687.

The data acquiring unit 681 outputs the code type data in 1-msec units input from the code calculating unit 6423a to the module CPU 645 and the exclusive OR calculating unit 683.

The replica code generating unit 682 generates a replica code array (a replica code sequence r) in 1-msec units to identify a 20-msec synchronization point in the navigation message, and outputs the array to the exclusive OR calculating unit 683.

FIG. 5 is a table showing 20 patterns of code sequences output from the replica code generating unit 682.

The length of each code of the navigation message is 20 msecs, and the code can be switched every 20 periods of the C/A codes having 1 msec period, that is, every 20 sets of code type data in 1-msec units. In the 20-ms synchronizing circuit 6423b, 20 patterns of the replica code sequences r(0) to r(19) (a plurality of comparison arrays) which are switched from "1" (a predetermined code type) to "0" (the other code type) at a different position from each other among the 20 replica codes (an inter-code position) (including the code switched at the head, that is, all of the codes to become "0") are to be compared with the array of the actually identified code type in 1-msec units. Note that, the replica code generating unit 682 does not need to hold all of the data of the replica code sequences r(0) to r(19) as a table in advance, and is only required to appropriately output the data.

The exclusive OR calculating unit 683 calculates an exclusive OR of the input code type in 1-msec units and the replica code of each replica code sequence input from the replica code generating unit 682, and outputs a calculation result, that is, a value indicating matching/mismatching to the comparison result preserving unit 684.

The comparison result preserving unit 684 integrates, for each of the replica code sequences r(0) to r(19), the values indicating the matching/mismatching of the code of each of the replica code sequences r(0) to r(19) output from the exclusive OR calculating unit 683 and the input code, and holds the calculated value as a result of a comparison result integrated value E(i) (i=0 to 19). The comparison result integrated value E(i) is to be "20" (perfect matching) if the code of the replica code sequence matches the input code 20 times in 20 times of comparison, and to be "0" (perfect mismatching) if the code of the replica code sequence never matches the input code. As described above, since the replica code sequences r(0) to r(19) indicate the variation patterns only when the code types vary from "1" to "0", if the code types in 1-msec units vary from "0" to "1" at the same timing when the replica code sequence r varies from "1" to "0", all of the 20 codes are to be mismatching (perfect mismatching). In other words, when the code types of all input codes are exactly determined and the code varies at the 20-msec synchronization point, the comparison result integrated value corresponding to the replica code sequence matched with the 20-msec synchronization point is to be "20" or "0" in 20 msecs, the comparison result integrated value E(i) reduces from 20 or increase from 0 one by one every time the replica code sequence shifts from 20-msec synchronization point by 1 msec. Note that, when the adjacent codes do not vary, the comparison result integrated value E(19) is to be perfect matching or imperfect matching during 20 msecs including the switching timing among these adjacent codes.

Furthermore, the comparison result preserving unit 684 holds a compatible degree F(i) (i=0 to 19) (a compatible matching degree). The compatible degree F(i) is an integrated value by converting the value of E(i) every 20 times of comparison, and an index indicating a compatible degree when a perfect matching and a perfect mismatching are handled equally. The compatible degree F(i) is calculated with the following expression (1):

$$F(i)=\Sigma m|N-2\times E(i)| \quad (1)$$

Here, $\Sigma m$ indicates the sum of the number of 20-msec periods m.

In other words, the compatible degree F(i) becomes maximum in both cases of the perfect matching and the imperfect matching, and becomes minimum when the number of matchings and the number of mismatchings are equal. Thus, without distinguishing the matching degree in the period in which the code types vary from "0" to "1" from the matching degree in the period in which the code types vary from "1" to "0", it is possible to easily accumulate (add up) a plurality of periods and evaluate.

The matching timing extracting unit 685 determines a replica code sequence to be a matching timing candidate according to the comparison result of the replica code sequences r(0) to r(19) and the input code held by the comparison result preserving unit 684, outputs information on the matching timing candidate to the verifying unit 687, and also outputs code switching timing information (timing data) in the replica code sequence to the module CPU 645.

The verifying unit 687 verifies whether it can be determined that the matching timing is appropriate based on the information on the matching timing candidate, and outputs the verification result to the module CPU 645.

The reference value setting unit 686 sets a reference value to verify the matching timing in the verifying unit 687, and outputs the value to the verifying unit 687.

Note that, the matching timing extracting unit 685, the reference value setting unit 686, and the verifying unit 687 each may be constituted by a dedicated hardware configuration (processor), or a part or all of the functions may be implemented according to software control by a program using a CPU and a RAM as a processor. The CPU and RAM may be dedicated to the 20-ms synchronizing circuit 6423*b*, or may be the module CPU 645.

Next, an information acquiring operation by receiving the satellite radio wave in the electronic watch 1 is described below.

In the electronic watch 1 of the present embodiment, the satellite radio wave receiving processing unit 60 is activated by the instruction of the host CPU 41, and the type of the information to be acquired, that is, the information on the current date and time, position, or the like is appropriately set. The satellite radio wave receiving processing unit 60 starts to receive the satellite radio wave, receives the radio wave from the positioning satellite according to the set type of the information to be acquired to perform necessary arithmetic processing, acquires the information to be acquired, and transmits the information to the host CPU 41.

Figure 6:
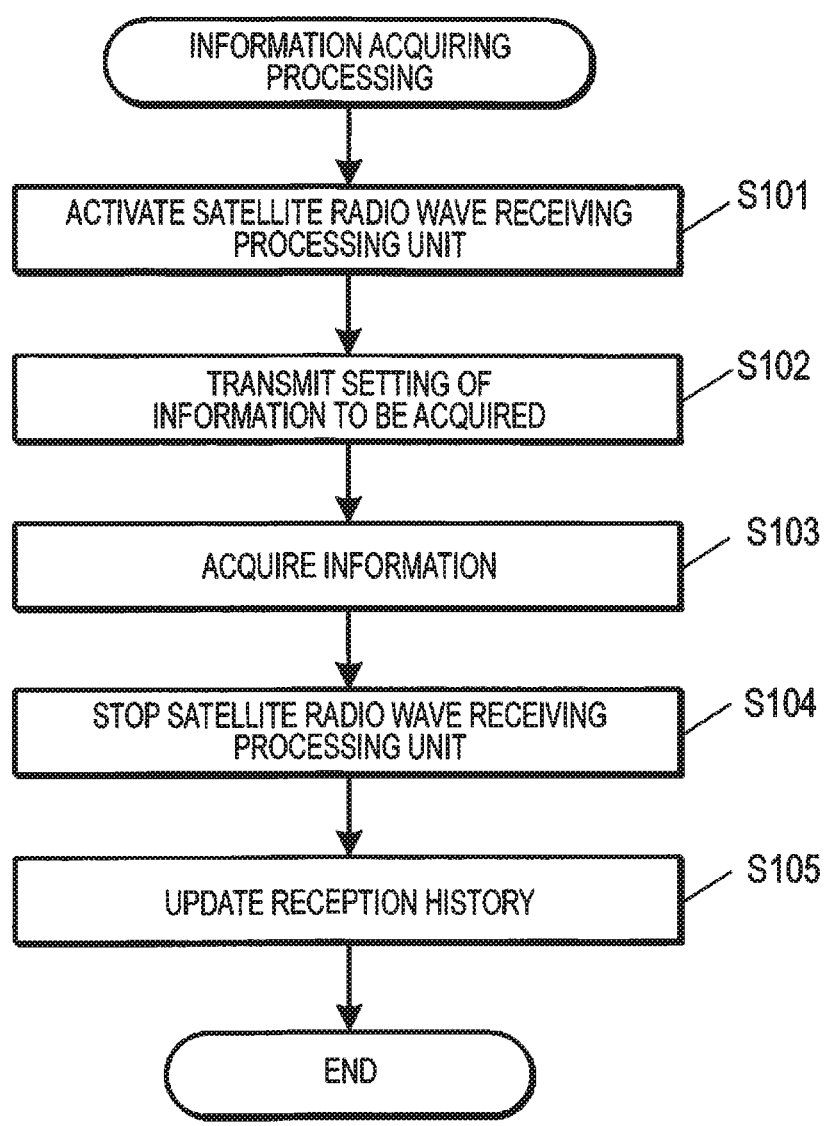
FIG. 6 is a flowchart of information acquiring processing performed by an electronic watch in the present embodiment.

FIG. 6 is a flowchart indicating a control procedure by the host CPU 41 in information acquiring processing performed in the electronic watch 1 of the present embodiment.

The information acquiring processing is started according to a user's predetermined input operation to the operation unit 49, a predetermined start condition, such as detection of incident light more than a reference value by a light sensor, which is not illustrated, once a day.

When the information acquiring processing is started, the host CPU 41 activates the satellite radio wave receiving processing unit 60 (step S101), and transmits the setting of the information to be acquired to the module CPU 645 (step S102). Then, the host CPU 41 waits for the acquired information transmitted from the satellite radio wave receiving processing unit 60 (the module CPU 645).

The host CPU 41 receives the data transmitted from the module CPU 645, acquires the information to be acquired, and causes the units to operate according to the information (step S103). This operating includes, for example, an operation to display a result on the display 47, or to update data of the RAM 43 or the counter 46.

The host CPU 41 stops the operation of the satellite radio wave receiving processing unit 60 (step S104), updates the reception history, and stores the updated history in the RAM 43 (step S105). Then, the host CPU 41 terminates the information acquiring processing.

Figure 7:
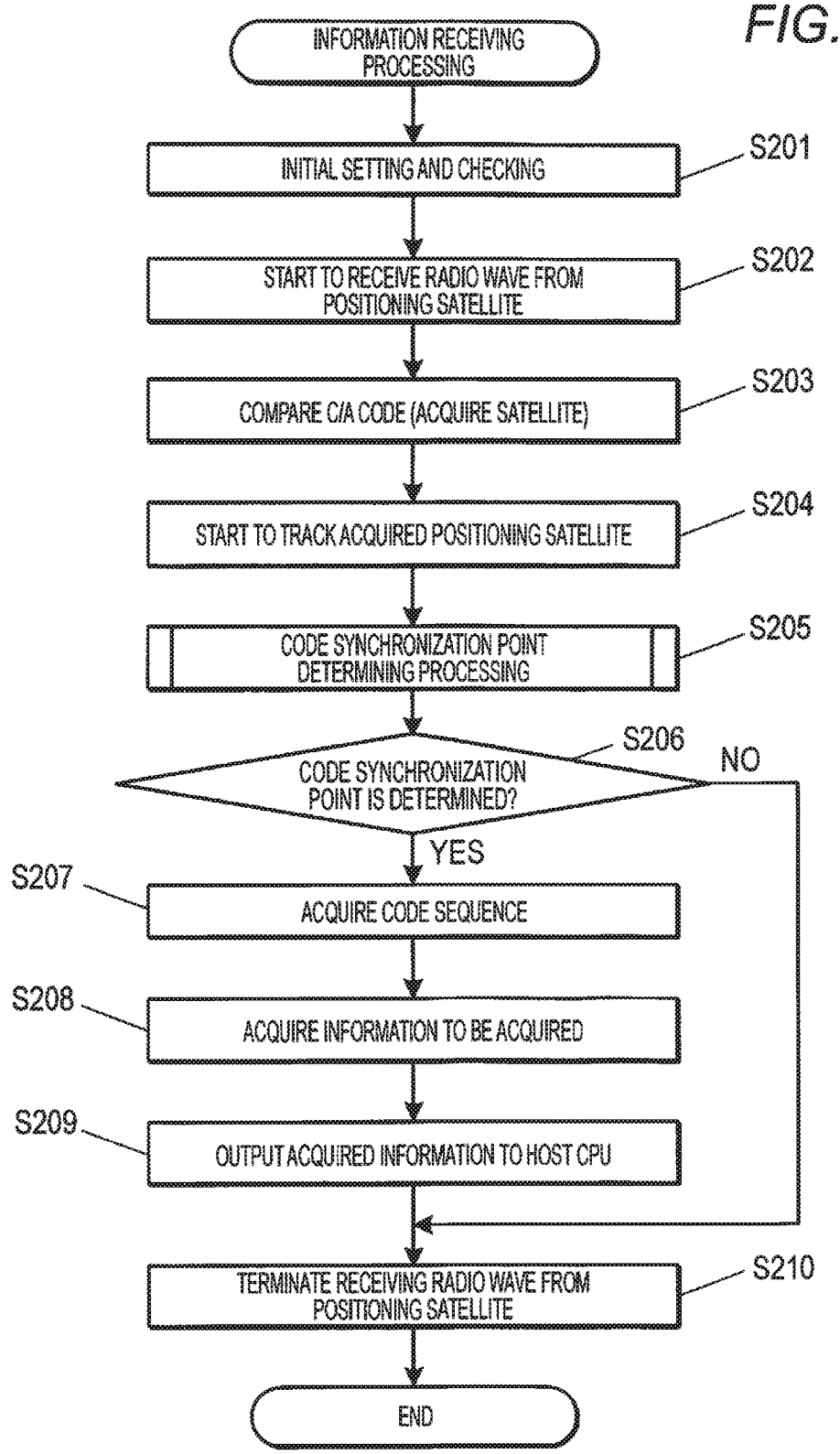
FIG. 7 is a flowchart of information receiving processing performed by a satellite radio wave receiving processing unit.

FIG. 7 is a flowchart illustrating a processing procedure of information receiving processing performed by the satellite radio wave receiving processing unit 60 of the electronic watch 1.

The information receiving processing is automatically started when the satellite radio wave receiving processing unit 60 is activated in the above described information acquiring processing.

When the information receiving processing is started, the module CPU 645 performs the initial setting and the activation checking (step S201). The initial setting includes setting of the information to be received acquired from the host CPU 41. At this time, a count number N, and the above described comparison result integrated value E(i) and compatible degree F(i) are initialized to "0". The module CPU 645 starts to receive the radio waves from positioning satellites (here, GPS satellites) (step S202).

The module CPU 645 causes the acquiring unit 641 to perform an acquisition operation to compare the chip array (replica code) known as the C/A code of each GPS satellite with the chip data of each received C/A code at each received frequency (step S203). The acquiring unit 641 calculates the correlation between the replica code and the chip of each received data, and acquires the received radio wave signal from the positioning satellite by identifying the C/A code and the phase which have a high correlation value at either frequency. At this time, the acquiring unit 641 can perform the correlation calculation of the replica code to a plurality of predetermined positioning satellites simultaneously in parallel.

When radio waves from more than the number of positioning satellites to be received set in the initial setting are acquired, the module CPU 645 starts the operation to cause the tracking unit 642 to track the radio wave of each positioning satellite acquired by the acquiring unit 641 (step S204). The tracking unit 642 determines the code type of the signal in 1-msec period while appropriately maintaining the phase of the C/A code, and performs code synchronization point determining processing to determine the head timing (code synchronization point) of each code in the signal of each positioning satellite (step S205). The code synchronization point determining processing is described later.

When the code synchronization point is determined, the module CPU 645 acquires the array (code sequence) of the message code in 20-msec units transmitted from each positioning satellite tracked by the tracking unit 642 (step S206). The module CPU 645 identifies each code using 20 code types obtained from the code synchronization point every msec.

The module CPU 645 decodes the acquired code sequence, and acquires the information to be acquired (step S207). Alternatively, the module CPU 645 may acquire, by comparing the acquire code sequence with the code sequence expected to be received and confirming the matching, the information to be acquired according to the timing when the matching of the contents of the expected code sequence is confirmed.

The module CPU 645 outputs the acquired information to be acquired to the host CPU 41 (step S208), and terminates receiving the radio waves from the positioning satellites in accordance with the instruction of the above described step S104 (step S209). Then, the module CPU 645 terminates the information receiving processing. Thereafter, the power supply to the satellite radio wave receiving processing unit 60 is disconnected according to the processing in the above described step S105, and the operation of the satellite radio wave receiving processing unit 60 is stopped.

Next, the operation contents of the code synchronization point determining processing called in the processing in the above described step S205 is described below.

As described above, the length of the signal (navigation message) transmitted from the GPS satellite is 20 msecs, that is, the message codes having the length of 20 periods of the C/A codes are arranged. Thus, when the code type identified every msec (1 kHz) in synchronization with the receiving period of the C/A code, the identified code type can vary every 20 codes, and the timing when the code type can vary needs to be determined to identify the code. In the electronic watch 1 of the present embodiment, a probabilistically correct head timing is identified according to an accuracy required for the electronic watch 1 taking the state in which the radio wave receiving intensity is low and misidentification of the code type is slightly expected into consideration.

Figure 8:
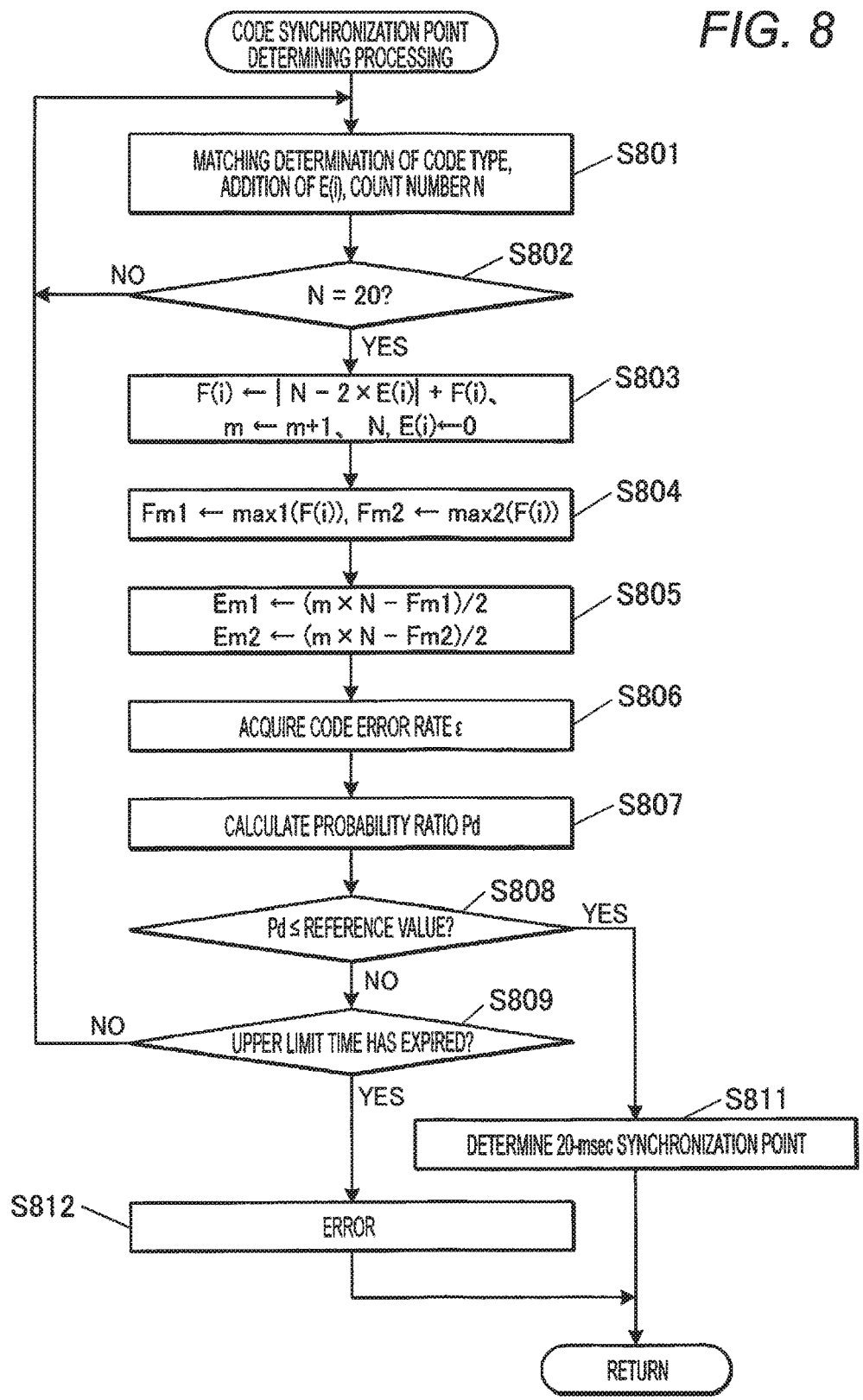
FIG. 8 is a flowchart of code synchronization point determining processing.

FIG. 8 is a flowchart illustrating a processing procedure of code synchronization point determining processing.

In the code outputting unit 6423, the code calculating unit 6423a identifies the code type every msec, and outputs the type to the exclusive OR calculating unit 683. Furthermore, every time the comparison result (exclusive OR) between the output of the exclusive OR calculating unit 683 and each replica code sequence r(i), the matching timing extracting unit 685 (or the CPU of the 20-ms synchronizing circuit 6423b, or the module CPU 645) updates the comparison result value by integrating the value with the comparison result integrated value E(i) of the comparison result preserving unit 684, and adds "1" to the count number N every time all comparison result integrated values E(i) are updated (step S801).

The matching timing extracting unit 685 determines whether the count number N is 20 (step S802). When determining that the count number N is not 20 ("NO" in step S802), the matching timing extracting unit 685 returns the processing to step S801.

When determining that the count number N is 20 ("YES" in step S802), the matching timing extracting unit 685 converts the comparison result integrated value E(i) of the comparison result preserving unit 684 into the additional value to the compatible degree F(i), and adds the additional value to the compatible degree F(i) stored in the comparison result preserving unit 684. Furthermore, the matching timing extracting unit 685 initializes the comparison result integrated value E(i) and the count number N to "0", and adds "1" to the number of 20-msec periods m (step S803).

The matching timing extracting unit 685 extracts the highest value max1(F(i)) among the calculated compatible degrees F(i) as a maximum compatible value Fm1, and extracts the second highest value max2(F(i)) as a second compatible value Fm2 (step S804). Furthermore, the matching timing extracting unit 685 restores the maximum compatible value Fm1 and the second compatible value Fm2 to the corresponding maximum comparison result integrated value Em1=(m×N−Fm1)/2, and second comparison result integrated value Em2=(m×N−Fm2)/2 respectively, and outputs the restored values together with the count number N and the number of 20-msec periods m to the verifying unit 687 (step S805). The maximum comparison result integrated value Em1 and the second comparison result integrated value Em2 obtained here become Em1 , Em2≥m×N/2 regardless of the original comparison result integrated value E(i). Thus, the switching timing of the code in the replica code sequence r corresponding to the maximum compatible value Fm1 to be a candidate of the head timing of each code.

When the maximum comparison result integrated value Em1 and the second comparison result integrated value Em2 are input, the verifying unit 687 acquires a code error rate ε (BER) (step S806). The code error rate c is, as described above, defined as a value according to the receiving intensity of the satellite radio wave and stored in the BER memory 646b of the memory 646, and the verifying unit 687 acquires, by referring to the BER memory 646b (or, acquiring the rate through the module CPU 645), the code error rate c according to the radio wave receiving intensity from the receiving positioning satellite. When there is no data relating to the corresponding radio wave receiving intensity, the code error rate c can be calculated with a predetermined function, such as linear interpolation, by using higher and lower adjacent radio wave receiving intensities and code error rates E. Alternatively, the code error rate corresponding to the closest radio wave receiving intensity to the actual receiving intensity among the rates stored in the BER memory 646b or the code error rate corresponding to the closest radio wave receiving intensity in the lower side than the obtained receiving intensity may be directly used.

The verifying unit 687 calculates the ratio (a probability ratio Pd) between a probability of occurrence P1 (a first incompatible probability of occurrence) of the maximum comparison result integrated value Em1 and a probability of occurrence P2 (a second incompatible probability of occurrence) of the second comparison result integrated value Em2 (step S807). The probabilities of occurrence P1 and P2 are the following expressions (2) and (3) respectively, and the probability ratio Pd is indicated with an expression (4).

$$P1 = (1-\varepsilon)^{m \cdot N - Em1} \cdot \varepsilon^{Em1} \cdot {}_{m \cdot N}C_{Em1} \quad (2)$$

$$P2 = (1-\varepsilon)^{m \cdot N - Em2} \cdot \varepsilon^{Em2} \cdot {}_{m \cdot N}C_{Em2} \quad (3)$$

$$Pd = P1/P2 \quad (4)$$

The probability ratio Pd indicates, when the correct head timing of the code is the switching timing of the code in the replica code sequence r (a second compatible comparison array) corresponding to the second comparison result integrated value Em2, the probability of identifying the incorrect position due to misidentifying the code, that is, the switching timing of the code in the replica code sequence r corresponding to the maximum comparison result integrated value Em1. In other words, as the probability ratio Pd is lower, the probability of being the correct head timing of the code in the replica code sequence r corresponding to the maximum comparison result integrated value Em1 becomes higher.

Here, the verifying unit 687 does not calculate the probability ratio Pd after calculating the probabilities of occurrence P1 and P2 separately to reduce the calculation processing amount, but may directly calculate the probability ratio Pd with the expression obtained by developing the expression of the above described probability ratio Pd. Furthermore, the probability ratio Pd does not need to be calculated exactly, and may be appropriately calculated with an approximation expression within a range in which the accuracy is not significantly reduced. As the approximation, for example, a linear approximation is used. Alternatively, the Stirling's approximation is preferably used corresponding to the probabilities of occurrence P1 and P2 which are binomial distribution. The verifying unit 687 enables the probability ratio Pd to be calculated with a simplified expression using the code error rate E, the maximum comparison result integrated value Em1, the second comparison result integrated value Em2, and the count number N as parameters in advance, and calculates the probability ratio Pd by substituting the parameters when these parameters are acquired.

The verifying unit 687 acquires the reference value for the probability ratio Pd from the reference value setting unit 686, and determines whether the calculated probability ratio Pd is less than the reference value (satisfies a predetermined compatibility condition) (step S808). The reference value can be appropriately set according to the accuracy required for the electronic watch 1, but may be a fixed value. In this case, the fixed value is incorporated into a program for code synchronization point determining processing, and the reference value setting unit 686 may not be provided. As the fixed value, for example, 10-8 is used. If the processing by the verifying unit 687 is performed, for example, once a day, the frequency of misidentifying the head timing of each code with the fixed value is once every 108 days, that is, once every about 270 thousand years, and is negligible in the product life.

Note that, as described above, when the code does not vary, the switching timing of the code is apparently matched with the replica code sequence r(19), and the calculation of the probability and the probability ratio Pd can be affected. Thus, the addition to the compatible degree F(i) may be stopped according to the relation between the replica code sequence r(19) obtained in the adjacent periods and the comparison result integrated value E(19), or the relation between the maximum comparison result integrated value Em1 in the adjacent periods and the replica code sequence corresponding to the second comparison result integrated value Em2, or a conventional method of other perfect matchings may be also used if the switching timing of the code is assumed to be matched with the replica code sequence r(19).

When determining that the probability ratio Pd is not less than the reference value ("NO" in step S808), the processing of the verifying unit 687 proceeds to step S809. The verifying unit 687 returns the processing to the matching timing extracting unit 685, and the matching timing extracting unit 685 determines whether a predetermined upper limit time has expired after the count of the count number N is started (step S809). When determining that the upper limit time has not expired ("NO" in step S809), the processing of the matching timing extracting unit 685 is returned to step S801. When determining that the upper limit time has expired ("YES" in step S809), the matching timing extracting unit 685 terminates, as an error, the determination of the code synchronization point, and outputs the verification result to the module CPU 645 (step S812). Then, the code synchronization point determining processing is terminated, and the processing is returned to the information receiving processing.

When determining that the calculated probability ratio Pd is less than the reference value in the determination processing in step S808 ("YES" in step S808), the verifying unit 687 decides (determines) the code synchronization point at the switching timing (maximum compatible timing) of the code in the replica code sequence (maximum compatible comparison array) corresponding to the maximum comparison result integrated value Em1 (step S811), outputs the verification result to the module CPU 645, terminates the code synchronization point determining processing, and returns the processing to the information receiving processing.

As described above, the satellite radio wave receiving processing unit 60 included in the electronic watch 1 of the present embodiment includes the front end 60a which receives a radio wave including a code signal transmitted from a positioning satellite, and the baseband unit 64 which acquires the code signal from the received radio wave, in which the baseband unit 64 includes the acquiring unit 641, as an acquiring unit, which identifies a pseudo-random code sequence used for performing spread spectrum to the code signal and the phase of the pseudo-random code sequence in a transmission period, the code calculating unit 6423a (and the IQ converting unit 6421, the phase control unit 6422) which identifies a code type of the code signal every time according to the transmission period of the pseudo-random code sequence, the 20-ms synchronizing circuit 6423b which identifies, by comparing an array of the identified code type with a plurality of replica code sequences r(i) expected to appear as the array of the code type, a head timing of each code in the code signal according to the replica code sequence r(i) in which a result of the comparison satisfies a predetermined condition, and the tracking unit 642, as the code type determining unit, the code synchronization detecting unit, and the code identifying unit, including the module CPU 645 or the like which identifies each code in synchronization with the identified head timing.

With these configurations, especially when the receiving intensity of the satellite radio wave is insufficient and the identification of the code type can include slight errors, probabilistically, the code synchronization point is determined at the time when higher accuracy than the necessary is acquired, and it is possible to reduce the possibility of prolonging the receiving time of the satellite radio wave and acquire necessary information easily and quickly while suppressing the load from increasing.

Furthermore, the replica code sequence r(i) is a code array of 20 bits according to 20 msecs which is the transmission time of each code in the code signal, and the tracking unit 642 accumulates a plurality of periods of the comparison results of the array of the code type with the replica code sequence r(i) every 20 msecs, and identifies the head timing of each code.

Thus, since it is unnecessary to increase the length or the size of the replica code sequence r(i), the storage capacity is not increased, and the processing load is not increased by the read.

Furthermore, each of the replica code sequences r(i) varies from "1" of the binary code to "0" midway, and has a different inter-code position, where the vary occurs, from each other, the tracking unit 642 calculates the compatible degree F(i) indicating a compatible degree according to a higher rate of a matching rate and a mismatching rate between each code type of the array of the code type compared for each period of replica code sequence r(i) and each code type of the replica code sequence r(i), and defines, as a candidate of the head timing, the inter-code position in the replica code sequence corresponding to the highest the maximum compatible value Fm1 of values obtained by integrating the periods of compatible degrees F(i).

Thus, if slight misidentification of the code type occurs, the identifying processing of the head timing by defining a probabilistically likelihood position as a candidate of the head timing, and which does not make the processing complicated and the processing time prolonged.

Furthermore, in order to identify the code type, the tracking unit 642 calculates, based on the code error rate c determined according to a receiving intensity of the satellite radio wave, the probability ratio Pd of the probability of occurrence P1 relating to an occurrence of the number of code types incompatible with the array of the code type in the replica code sequence corresponding to the maximum compatible value Fm1 (does not match if the number of matching is larger, does not mismatch if the number of mismatchings is larger) to the probability of occurrence P2 relating to an occurrence of the number of code types incompatible with the array of the code type in the replica code sequence corresponding to the second compatible value Fm2 which is the second highest compatible degree F(i), and determines whether the candidate of the head timing determined according to whether the compatibility condition that the probability ratio Pd is less than the predetermined reference value is satisfied is identified as the head timing.

Thus, it is possible to identify, as the correct head timing of the code in accordance with the required accuracy, the inter-code position satisfying the condition that the probability of accidentally misidentifying the inter-code position of the replica code sequence having the second highest compatible degree as the correct inter-code position due to misidentifying the code type is sufficiently low. In other words, it is possible to sufficiently reduce the possibility of misrecognizing the code synchronization point according to a required accuracy.

Furthermore, since the memory 646 which stores the correspondence relation between the receiving intensity of the satellite radio wave and the code error rate as the BER memory 646*b* is provided, it is possible to easily acquire the code error rate from the receiving intensity.

Furthermore, the memory 646 stores data in which a plurality of receiving intensities set in advance and a code error rate in the receiving intensity are associated with each other, and the verifying unit 687 of the tracking unit 642 calculates, based on the data, the code error rate according to the receiving intensity of the radio wave by performing interpolation with a predetermined function.

Thus, the size of the BER memory 646*b* does not need to be increased more than necessary, and it is possible to acquire, with simple calculate processing, such as linear interpolation, the code error rate without a practical problem.

Furthermore, the probability of occurrence P1 and the probability of occurrence P2 are binomial distribution, and the tracking unit 642 calculates the probability ratio Pd with a predetermined approximation expression. In other words, with regard to the processing the calculate amount of which increases when the calculation is exactly performed, the calculation is simplified within a range in which the accuracy is not adversely affected, and it is possible to appropriately identify the code synchronization point while reducing the processing load and the processing time.

Furthermore, the electronic watch 1 of the present embodiment includes the above described satellite radio wave receiving processing unit 60, the counter 46 which counts a date and time, and the display 47 which displays an hour based on the date and time counted by the counter 46, in which the baseband unit 64 calculates the current date and time from the acquire signal, and outputs data to correct the date and time counted by the counter 46 according to the calculated current date and time.

Thus, with the electronic watch 1, it is possible to easily certainly acquire date and time information, and maintain the correct date and time by correcting the date and time of the counter 46 without prolonging the receiving time by the satellite radio wave receiving processing unit 60 more than necessary while suppressing the load.

Furthermore, a code signal acquiring method of the present embodiment is a code signal acquiring method for acquiring a code signal from a reception signal of a radio wave including a code signal transmitted from a positioning satellite, the code signal acquiring method includes an acquiring step of identifying a pseudo-random code sequence used for performing spread spectrum to the code signal and a phase of the pseudo-random code sequence in a transmission period, a code type determining step of identifying a code type of the code signal every time according to the transmission period of the pseudo-random code sequence, a code synchronize detecting step of identifying, by comparing an array of the identified code type with a plurality of replica code sequences expected to appear as the array of the code type, a head timing of each code in the code signal according to the replica code sequence in which a result of the comparison satisfies a predetermined condition, and a code identifying step of identifying each code in synchronization with the identified head timing.

In other words, since the optimal inter-code position is defined as the code synchronization point by condition determination using the comparison of the replica code sequence to identify the code synchronization point, especially when the receiving intensity is low, and if the code type cannot be completely identified without misrecognition during the code synchronization point is identified, it is possible to suppress the rate of prolonging the receiving time more than necessary due to re-reception, and thus it is possible to easily quickly acquire the code signal more certainly while suppressing configurations, such as reception of an L2 band or identification of a P code, or load from increasing.

Furthermore, a program 646*a* relating to acquisition of a date and time and a positioning operation of the present embodiment causes a computer, which acquires a code signal from a reception signal of a radio wave including the code signal (navigation message) transmitted from a positioning satellite, to function as an acquiring unit configured to identify a pseudo-random code sequence used for performing spread spectrum to the code signal and a phase of the pseudo-random code sequence in a transmission period, a code type determining unit configured to identify a code type of the code signal every time according to the transmission period, a code synchronization detecting unit configured to identify, by comparing an array of the identified code type with a plurality of comparison arrays expected to appear as the array of the code type, a head timing of each code in the code signal according to the comparison array in which a result of the comparison satisfies a predetermined condition, and a code identifying unit configured to identify each code in synchronization with the identified head timing.

Thus, without configurations and processing necessary for receiving an L2 band or identifying a P code, and increasing the load, it is possible to acquire a code signal with a quick brief operation.

Note that, the present invention is not limited to the above embodiment, and can be variously modified.

For example, in the above embodiment, the code type is acquired for each transmission period of the pseudo-random code sequence, but may be acquired each from a plurality of periods into which the transmission period is further divided. In this case, the replica code sequence r is only required to be generated only at the timing synchronized with the head of each period of the pseudo-random code.

In the above embodiment, the comparison result of a plurality periods of the C/A codes is added and a likelihood inter-code position is defined as the code synchronization point according to the periods of the results. However, when the sufficiently receiving sensitivity is high and it can be determined, from the comparison result of each replica code sequence, that misidentification does not occur, the code synchronization point may be determined according to the comparison result of one period or a short period regardless of probability.

Furthermore, it has been described that the following processing is necessarily performed regardless of the absolute value of the number of incompatible code types in each transmission period of the C/A code in the above embodiment. However, if the minimum number of incompatible code types is a predetermined reference value or more (for example, more than 3 of 20), the result of the transmission period may not be used (added) for the following processing, and the processing in the period of the verifying unit 687 may not be omitted as it is recognized that the code type has not been determined with the obviously sufficient accuracy.

In the above embodiment, 20 patterns which vary from "1" to "0" are exemplified as the replica code sequence r(i), but the patterns may vary from "0" to "1", or these patterns may be mixed. Alternatively, 40 patterns of both of a variation pattern from "1" to "0" and a variation pattern from "0" to "1" are held, and the patterns having the same inter-code position are added up by handling mismatching and matching separately, or using dispersion of the number of matchings, and thus the inter-code position may be identified.

Furthermore, the BER memory 646*b* stores a plurality of stages of receiving intensities and the code error rate corresponding to the receiving intensity, and acquires the code error rate by performing interpolation as necessary in the above embodiment, but may store expression or the like and calculate the code error rate according to the receiving intensity.

Furthermore, in the above embodiment, it is exemplified that the electronic watch 1 which is a radio controlled watch is equipped with the satellite radio wave receiving processing unit 60, but the present invention can be applied to the case that an electronic device in which a clock function is a main function, such as a positioning device or a navigation device, is equipped with the satellite radio wave receiving processing unit 60.

Furthermore, in the above embodiment, it is exemplified the case in which a radio wave from a GPS satellite is received, but the present invention can be applied to the Japanese MICHIBIKI or European Galileo which uses the same radio wave transmission method as the GPS satellite. Furthermore, the present invention can be similarly applied to the Russian GLONASS by adjusting a frequency, a modulation method, a C/A code length (511 chip), or the like.

Furthermore, in the above descriptions, the nonvolatile memory of the memory 646 is exemplified as a computer-readable medium (storage medium) storing operation control programs relating to the information receiving processing in the satellite radio wave receiving processing unit 60 according to an embodiment of the present invention, especially, the code synchronization point determining processing, but the computer-readable medium is not limited to this. As other computer-readable mediums, a portable recording medium, such as a hard disk drive (HDD), a CD-ROM, or a DVD disc, is applicable. Furthermore, as a medium which provides data of the programs according to the present invention through a communication line, a carrier wave can be applied to the present invention.

In addition, the concrete configurations, operation contents, procedures, or the like described in the above embodiments can be modified without departing from the scope of the present invention.

It has been the embodiments of the present invention, but the scope of the present invention is not limited to the above described embodiments, and includes the scope described in the claims and equivalents thereof.

The invention claimed is:

1. A satellite radio wave receiving apparatus comprising:
   a receiver configured to receive a radio wave including a code signal transmitted from a satellite; and
   a demodulator configured to acquire the code signal from the received radio wave, wherein the demodulator is configured to:
   identify a pseudo-random code sequence used for performing spread spectrum to the code signal and a phase of the pseudo-random code sequence in a transmission period;
   identify a code type of the code signal for every transmission period;
   identify, by comparing an array of the identified code type with a plurality of comparison arrays expected to appear as the array of the code type, a head timing of each code in the code signal according to the comparison array in which a result of the comparison satisfies a predetermined condition,
   wherein the comparison array has a length according to a transmission time of each code in the code signal, and
   wherein the demodulator accumulates, in the length of the comparison array, a plurality of periods of results of the comparison of the array of the code type with the comparison array, and identifies the head timing; and
   identify each code in synchronization with the identified head timing.

2. The satellite radio wave receiving apparatus according to claim 1,
   wherein each of the plurality of comparison arrays varies from a predetermined code type of a binary code to the other code type midway, and has a different inter-code position, where the vary occurs, from each other, and
   wherein the demodulator calculates a compatible matching degree indicating a compatible degree according to a higher rate of a matching rate and a mismatching rate between each code type of the array of the code type compared for each period of the comparison array and each code type of the comparison array, defines the inter-code position in a maximum compatible comparison array corresponding to a highest value of values obtained by integrating the plurality of periods of compatible matching degrees as a maximum compatible timing, and defines the maximum compatible timing as a candidate of the head timing.

3. A radio controlled watch comprising:
   a satellite radio wave receiving apparatus according to claim 1;
   a counter configured to count a date and time; and
   a display configured to display an hour based on the date and time counted by the counter,
   wherein the demodulator calculates a current date and time from the acquired signal, and corrects the date and time counted by the watching unit according to the calculated current date and time.

4. The satellite radio wave receiving apparatus according to claim 2,
   wherein in order to identify the code type, the demodulator calculates, based on a misidentification incidence rate determined according to a receiving intensity of the radio wave, a probability ratio of a first incompatible probability of occurrence relating to an occurrence of the number of incompatible code types in the maximum compatible comparison array to a second incompatible probability of occurrence relating to an occurrence of the number of incompatible code types in a second compatible comparison array corresponding to a second highest value of the values obtained by integrated the plurality of periods of the compatible matching degrees, and determines whether the maximum compatible timing is identified as the head timing according to whether the probability ratio satisfies a predetermined compatibility condition.

5. A radio controlled watch comprising:
   a satellite radio wave receiving apparatus according to claim 2;

a counter configured to count a date and time; and a display configured to display an hour based on the date and time counted by the counter, wherein the demodulator calculates a current date and time from the acquired signal, and corrects the date and time counted by the counter according to the calculated current date and time.

6. The satellite radio wave receiving apparatus according to claim 4 further comprising a memory configured to store a correspondence relation between the receiving intensity and the misidentification incidence rate.

7. The satellite radio wave receiving apparatus according to claim 4, wherein the first incompatible probability of occurrence and the second incompatible probability of occurrence are binomial distribution, and wherein the demodulator calculates the probability ratio with a predetermined approximation expression.

8. A radio controlled watch comprising:

a satellite radio wave receiving apparatus according to claim 4;

a counter configured to count a date and time; and a display configured to display an hour based on the date and time counted by the counter, wherein the demodulator calculates a current date and time from the acquired signal, and corrects the date and time counted by the counter according to the calculated current date and time.

9. The satellite radio wave receiving apparatus according to claim 6, wherein the memory stores data in which a plurality of receiving intensities set in advance and the misidentification incidence rate in the receiving intensities are associated with each other, and wherein the demodulator calculates, based on the data stored in the memory, the misidentification incidence rate according to the receiving intensities of the radio wave by performing interpolation with a predetermined function.

10. The satellite radio wave receiving apparatus according to claim 6, wherein the first incompatible probability of occurrence and the second incompatible probability of occurrence are binomial distribution, and wherein the demodulator calculates the probability ratio with a predetermined approximation expression.

11. A radio controlled watch comprising:

a satellite radio wave receiving apparatus according to claim 6;

a counter configured to count a date and time; and a display configured to display an hour based on the date and time counted by the counter, wherein the demodulator calculates a current date and time from the acquired signal, and corrects the date and time counted by the counter according to the calculated current date and time.

12. A radio controlled watch comprising:

a satellite radio wave receiving apparatus according to claim 7;

a counter configured to count a date and time; and a display configured to display an hour based on the date and time counted by the counter, wherein the demodulator calculates a current date and time from the acquired signal, and corrects the date and time counted by the counter according to the calculated current date and time.

13. The satellite radio wave receiving apparatus according to claim 9, wherein the first incompatible probability of occurrence and the second incompatible probability of occurrence are binomial distribution, and wherein the demodulator calculates the probability ratio with a predetermined approximation expression.

14. A radio controlled watch comprising:

a satellite radio wave receiving apparatus according to claim 9;

a counter configured to count a date and time; and a display configured to display an hour based on the date and time counted by the counter, wherein the demodulator calculates a current date and time from the acquired signal, and corrects the date and time counted by the counter according to the calculated current date and time.

15. A code signal acquiring method for acquiring a code signal from a reception signal of a radio wave including a code signal transmitted from a satellite, the code signal acquiring method comprising:

identifying a pseudo-random code sequence used for performing spread spectrum to the code signal and a phase of the pseudo-random code sequence in a transmission period;

identifying a code type of the code signal for every transmission period;

identifying, by comparing an array of the identified code type with a plurality of comparison arrays expected to appear as the array of the code type, a head timing of each code in the code signal according to the comparison array in which a result of the comparison satisfies a predetermined condition, wherein the comparison array has a length according to a transmission time of each code in the code signal, and wherein in the length of the comparison array, a plurality of periods of results of the comparison of the array of the code type with the comparison array is accumulated; and identifying each code in synchronization with the identified head timing.

16. A non-transitory recording medium recording a computer-readable program for acquiring a code signal from a reception signal of a radio wave including a code signal transmitted from a satellite, the computer-readable program causing a computer to:

identify a pseudo-random code sequence used for performing spread spectrum to the code signal and a phase of the pseudo-random code sequence in a transmission period;

identify a code type of the code signal every time according to the transmission period;

identify, by comparing an array of the identified code type with a plurality of comparison arrays expected to appear as the array of the code type, a head timing of each code in the code signal according to the comparison array in which a result of the comparison satisfies a predetermined conditions, wherein the comparison array has a length according to a transmission time of each code in the code signal, and wherein in the length of the comparison array, a plurality of periods of results of the comparison of the array of the code type with the comparison array is accumulated; and identify each code in synchronization with the identified head timing.

* * * * *